UNITED STATES PATENT OFFICE.

JOHN A. JUST, OF SYRACUSE, NEW YORK.

SOLIDIFIED MINERAL OIL AND METHOD OF MAKING SAME.

SPECIFICATION forming part of Letters Patent No. 658,988, dated October 2, 1900.

Application filed April 14, 1900. Serial No. 12,930. (No specimens.)

*To all whom it may concern:*

Be it known that I, JOHN A. JUST, of Syracuse, in the county of Onondaga and State of New York, have invented new and useful Improvements in Solidified Mineral-Oil Distillates and Methods of Making the Same, of which the following is a full, clear, and exact description.

My invention relates to the solidification of mineral-oil distillates; and it consists of a new process and product.

I change mineral-oil distillates from their usual liquid state to a state of permanent jelly-like solidity by incorporating them with a solution of casein and soap. To such a solution I prefer to add glycerin, as glycerin incorporated with the product enables it better to withstand the breaking-down tendency of low temperatures, and it renders the casein more soluble and transparent.

Generally stated, my process is as follows: I add to a given quantity of a solution of casein, soap, glycerin, and water a somewhat less quantity of mineral-oil distillate and thoroughly agitate the mixture until it unites and forms a uniform emulsion. Then I gradually add more distillate and incorporate it with the emulsion-like mass by agitation. The mass becomes thicker as additional distillate is incorporated and finally acquires a stiff jelly-like consistency.

In carrying out my process I first prepare a solution consisting of about four parts, by weight, of desiccated caseinate, such as suitable sodium caseinate, in about seventy parts of water, to which I add about one to three parts of soap and about nine parts of glycerin. This solution may be made by adding the glycerin to the water and then dissolving the caseinate in it. Heating the mixture on a water-bath will facilitate the complete solution of the casein. Then the soap may be added and dissolved. The parts are to be estimated by weight. The caseinate is soluble in water. I pour this solution, preferably when it is hot, into a suitable vessel containing, say, thirty parts of mineral-oil distillate—such as petroleum, ether, or naphtha—at ordinary temperature and thoroughly shake the mixture. It soon emulsifies, becoming uniform in appearance and showing a tendency to adhere to the sides of the vessel. When this condition is reached, I add more distillate—say, thirty more parts—and continue the shaking until it is absorbed or incorporated with the emulsified or partially-solidified mass. Then I gradually add more distillate, a small quantity at a time, and incorporate it with the mass by shaking until the solidifying capacity of the solution is exhausted. Then the mass will have reached a solid jelly-like form.

The solution described will solidify about twenty times its weight of the lighter distillates, such as naphtha or benzene.

In carrying out the process care should be taken that each addition of distillate is thoroughly incorporated with the mass before another addition is made and too large a quantity of distillate should not be added at one time. Should a larger quantity be added than is readily absorbed by continued shaking, the mass should be allowed to rest and part of the distillate poured off. Renewed shaking will then bring about a solidification or thickening, and the liquid withdrawn may be readded and incorporated.

If desired, less water than the amount specified may be used at the start and more water added later. A small quantity of water added at any stage of the process often facilitates the incorporation.

As stated, a solidification may be effected by the solution of casein and soap without the addition of glycerin, but glycerin improves the product.

A desiccated caseinate is specified herein, as it is a desirable form of casein from which to make a solution, and definite quantities of it can be indicated; but an equivalent solution may be made direct from milk-curd in ways well known, if desired.

A good tallow soap is suitable for the solution, but other soap may be used.

Mineral-oil distillates (or mixtures of such distillates) may be solidified in the manner described, and thus made available for new uses. In their changed form they give off their vapors but slowly and are practically non-explosive. They emulsify readily in cold water and may be used with advantage in washing clothes and other fabrics, and leaving, as they do, but a very light and harmless residue, which is soluble in water and easily removed by sponging, they may be safely used in cleaning clothes. The benzene or other distillate in this jelly-like form may be applied to the garment to be cleansed by a sponge or rag and when dried brushed off or sponged off, as aforesaid.

It is known that mineral-oil distillates can be solidified by being incorporated with a solution of soap; but such solidifications are not stable or permanent. They readily break down and go back into liquid form and are of no practical value. This is due to the insufficient strength of the structure built up by the process in question, and the essence of my invention lies in the incorporation with the emulsifying solution of a structure-preserving material. For practical purposes this material must be insoluble in mineral-oil distillates and must dissolve in water at ordinary temperatures to form a tenacious or viscid solution. There exists a number of materials answering this description which produce more or less permanency of jelly structure; but of all these I prefer a soluble caseate, as above described, since this substance produces a jelly stable in extreme cold and which improves with age.

I employ soap in connection with casein, as described, and produce a stable and permanent solidification. Casein and caseinate are insoluble in mineral-oil distillates, and it gives their solidifications necessary strength and firmness.

Mineral-oil distillates solidified by being incorporated, as described, with a casein-soap-glycerin-water solution of the proportions given retain their acquired jelly-like form under extreme variations of temperature. They will not melt and spread when ignited, but will burn.

Having thus fully described my invention, what I claim, and desire to protect by Letters Patent, is—

1. A composition of matter consisting of a mineral-oil distillate, thickened or solidified by an aqueous solution of soap and a substance insoluble in said distillate and forming with water at ordinary temperatures a tenacious or viscid solution.

2. The herein-described composition of mineral-oil distillate and a solution of a caseinate and soap in water.

3. The herein-described composition consisting of a mineral-oil distillate and a solution of a caseinate, soap and glycerin in water.

4. The process of solidifying mineral-oil distillates which consists in incorporating therein by agitation an aqueous solution of soap and a substance insoluble in said distillates and forming with water at ordinary temperatures a tenacious or viscid solution.

5. The process of solidifying mineral-oil distillates which consists in incorporating such liquids by agitation with a solution of a caseinate, soap and glycerin in water.

6. The process of solidifying mineral-oil distillates which consists in emulsifying such distillates by shaking a quantity thereof with a suitable quantity of a solution of a caseinate and soap in water, and in then gradually adding and incorporating more of such distillates by agitation.

In testimony whereof I have hereunto signed my name.

JOHN A. JUST. [L. S.]

Witnesses:
FORMAN WILKINSON,
C. C. SCHOENECK.